Patented June 17, 1941

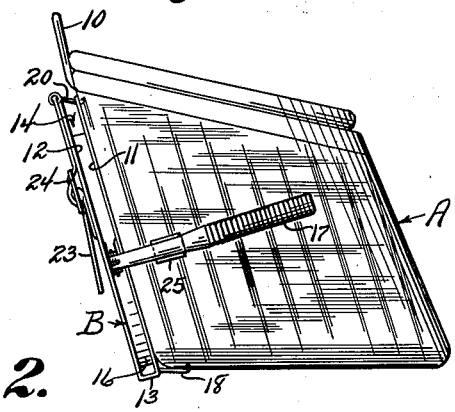
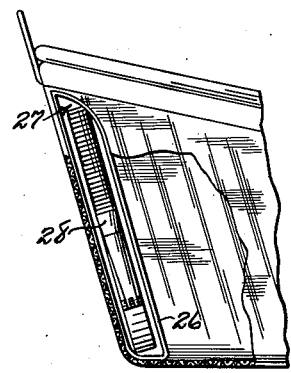
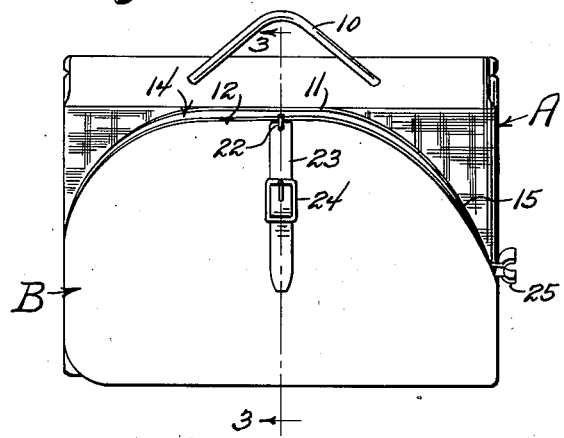
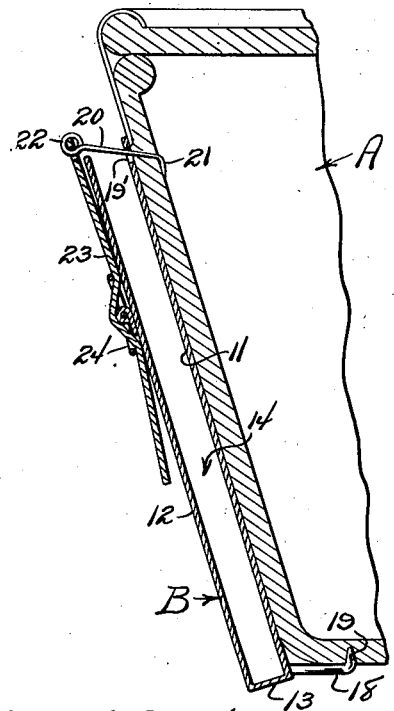
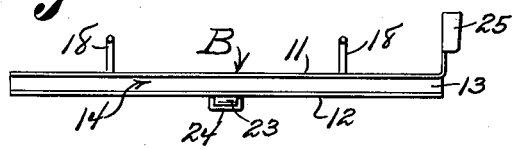

2,246,089

UNITED STATES PATENT OFFICE 2,246,089

LANDING NET CARRIER

Marion N. Davis, The Dalles, Oreg.

Application February 29, 1940, Serial No. 321,558

4 Claims. (Cl. 43—31)

The invention relates to a carrier and more especially to landing net carriers for association with fishing baskets or the like.

The primary object of the invention is the provision of a carrier of this character wherein a landing net used by fishermen can be conveniently placed therein for ready use, the carrier being either built within the basket or attached exteriorly thereof at one side of the same and the net will be wholly contained within the carrier and the handle of such net latched so as to be out of the way and not interfere with the carrying of the basket either by hand or through the medium of a shoulder strap.

Another object of the invention is the provision of a carrier of this character wherein the construction thereof is novel in its entirety and is of a form so that a landing net may be held therein for the easy and convenient removal of the same, being of a makeup to avoid occupancy of considerable space and also to be susceptible of association with a fishing basket of the conventional or special type.

A further object of the invention is the provision of a carrier of this character, which is simple in its construction, thoroughly reliable and efficient in operation, enabling the storage of a landing net and its removal, being attached to or built within a fishing basket and in such build will not interfere with the convenient carrying of the basket, and inexpensive to manufacture.

With these and other objects in view, the invention consists in the features of construction, combination and arrangement of parts as will be hereinafter more fully described in detail, illustrated in the accompanying drawing, which discloses the preferred and modified forms of embodiment of the invention and pointed out in the claims hereunto appended.

In the accompanying drawing:

Figure 1 is an end elevation of a fishing basket showing the carrier constructed in accordance with the invention attached thereto and carrying a landing net employed by fishermen.

Figure 2 is an elevation looking toward the outer side of the carrier.

Figure 3 is an enlarged sectional view taken on the line 3—3 of Figure 2 looking in the direction of the arrows.

Figure 4 is a top plan view of the carrier removed from the basket.

Figure 5 is a fragmentary end elevation of the fishing basket showing a modification of the carrier in association therewith.

Similar reference characters indicate corresponding parts throughout the several views in the drawing.

Referring to the drawing in detail, particularly Figures 1 to 4, inclusive, A designates generally a conventional type of fishing basket, which may be hung from the shoulder of a user or carried in the hand, a handle 10 being a part of the basket for the hand carrying thereof, while the shoulder strap for the hanging of the basket upon the shoulder of a user is not shown.

Adapted to be associated with the basket A is a landing net carrier B which constitutes the present invention and is adapted to be located at any one of the sides of the said basket exteriorly thereof. This carrier B comprises inner and outer body plates or cheeks 11 and 12, respectively, these being joined with each other in normally spaced parallel relation through the medium of a connecting web 13 which creates the bottom to a pocket 14 formed between the said plates or cheeks 11 and 12. It is preferable to have the uppermost ends of the plates or cheeks 11 and 12 remote from the bottom 13 similarly rounded at 15 and adapted to be accommodated within the pocket 14 is a landing net, a portion thereof being indicated at 16, which is the frame thereof for supporting the net fabric body, and this frame in this instance is connected with a swingable handle 17 convenient for the ready handling of the landing net in the use thereof.

The plate or cheek 11 at the lowermost edge portion thereof has projecting outwardly thereof a pair of fastening prongs 18, the penetrating tips or spurs 19 of which are adapted for anchorage within the basket A at the bottom thereof. This plate or cheeck 11 is adapted to overlie and have contact with a side exteriorly thereof of the basket A when the carrier is associated with said basket. The plate or cheek 11 medially thereof next to the uppermost edge has formed therein a hole 19 for accommodating the shank or prong 20 of a hanger member when the latter is driven into the body of the basket A and such shank or prong is clenched at 21 to the body. In this manner the carrier is fastened in usable position upon the basket for accommodating the landing net while such member at the outer eye terminal 22 thereof has loosely connected thereto an adjustable fastening strap 23 engageable with a buckle 24 secured exteriorly to the plate or cheek 12 thus fastening the latter for the retaining of the net when stored within the pocket 14 of such carrier. In this fashion the plate or cheek 12 will be prevented from undue displacement from the plate or cheek 11, especially resultant from bulging due to the packing of the pocket 14 when receiving the net 16.

The cheek or plate 11 at one end thereof has formed thereon at substantially right angles thereto a handle clip 25 for receiving and holding the handle 17 when engaged therein and thus disposing the said handle in overlying close relation to an end of the basket or a side thereof as is clearly shown in Figure 1 of the drawing. This maintains the handle 17 of the net 16 in a position to avoid interference in the wearing of the basket A as heretofore stated and also permits of the detachment of the handle 17 when it is desired to remove the net 16 from the carrier for its use by a fisherman.

In Figure 5 of the drawing there is shown a slight modification of the invention wherein the carrier for the net involves a body housing formation 26 built interiorly of the basket in juxtarelation to one side wall thereof and opens only at one end through the body of the said basket for giving access to a pocket 27 created by such formation 26.

Through this open end is inserted the net for the storage of the same within the basket and confined within the formation 26, the handle 28 of the net being folded for reception within the pocket 27 and thus the net and the handle are confined therein.

The prong or shank 20 of the hanger member and its eye 22 constituting the latter overhangs the plate or cheeek 12 and is projected from the basket A to have the strap 23 positioned outside of the pocket 14 and outwardly of the said plate or cheek 12 so that it can be adjustably engaged with the buckle 24 in the fastening thereof.

The foregoing description taken in connection with the drawing in its disclosure makes it appear that the net can be conveniently and easily stored within or without the basket and confined in the carrier thus constructed as hereinbefore set forth.

What is claimed is:

1. A landing net carrier for a fishing basket having a flat-walled body, comprising spaced cheeks, a connecting bottom following the lowermost edges of said cheeks, fastening means projecting from one cheek at the lowermost portion thereof and engaging the body, a hanger member anchored within the body and passed through one of the cheeks, a buckle carried at the outer side of the outermost cheek, and an adjustable fastening strap depending from the hanger and engageable with said buckle.

2. A landing net carrier for a fishing basket having a flat-walled body, comprising spaced cheeks, a connecting bottom following the lowermost edges of said cheeks, fastening means projecting from one cheek at the lowermost portion thereof and engaging the body, a hanger member anchored within the body and passed through one of the cheeks, a buckle carried at the outer side of the outermost cheek, an adjustable fastening strap depending from the hanger and engageable with said buckle, and a clip formed with the innermost cheek and disposed at substantially right angles to the plane thereof.

3. A landing net carrier for fishing baskets, comprising two spaced walls having an open end and adapted to be attached to the outer face of a fishing basket, and a clip carried by the innermost wall at one end and disposed at substantially right angles thereto along the end wall of a fishing basket.

4. A landing net carrier for fishing baskets, comprising two spaced walls having an open end and adapted to be attached to the outer face of a fishing basket, releasable means for fastening the upper free ends of the walls together, and a clip carried by the innermost wall at one end and disposed at substantially right angles thereto along the end wall of a fishing basket.

MARION N. DAVIS.